US010797896B1

(12) United States Patent
Earl

(10) Patent No.: US 10,797,896 B1
(45) Date of Patent: Oct. 6, 2020

(54) DETERMINING THE STATUS OF A NODE BASED ON A DISTRIBUTED SYSTEM

(71) Applicant: Ivanti, Inc., South Jordan, UT (US)

(72) Inventor: Michael Earl, Lindon, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 15/790,489

(22) Filed: Oct. 23, 2017

Related U.S. Application Data

(63) Continuation of application No. 13/471,253, filed on May 14, 2012, now Pat. No. 9,800,423.

(51) Int. Cl.
*H04L 12/18* (2006.01)
*H04L 12/26* (2006.01)
(Continued)

(52) U.S. Cl.
CPC ...... *H04L 12/1831* (2013.01); *H04L 12/1877* (2013.01); *H04L 29/08306* (2013.01); *H04L 29/08324* (2013.01); *H04L 29/08351* (2013.01); *H04L 29/08387* (2013.01); *H04L 29/08405* (2013.01); *H04L 41/0863* (2013.01); *H04L 41/30* (2013.01); *H04L 43/0817* (2013.01);
(Continued)

(58) Field of Classification Search
CPC ......... H04L 12/1831–189; H04L 12/55; H04L 43/0811–0817; H04L 67/10–1097; H04L 12/2823; H04L 29/08306; H04L 29/08351; H04L 29/08387; H04L 29/08396–08441; H04L 41/0856; H04L 41/12; H04L 41/30; H04L 43/10–16; H04L 67/104; H04L 67/1051; H04L 67/1061–1072; H04L 41/085–0856; H04L 43/08–0817; G06F 11/181–189; G06F 11/2005–2089; G06F 11/324–3476; G06F 15/16; G06F 8/61–65; H04M 3/5175–56; H04W 40/24; H04W 40/32
See application file for complete search history.

(56) References Cited

U.S. PATENT DOCUMENTS 5,682,949 A * 11/1997 Ratcliffe ............ G05D 23/1905
165/209
5,706,210 A * 1/1998 Kumano ............... H04L 43/065
709/224
(Continued)

FOREIGN PATENT DOCUMENTS

WO      WO 2017/197258        11/2017

OTHER PUBLICATIONS

Office Action for U.S. Appl. No. 14/061,015, dated Sep. 1, 2017, 21 pages.
(Continued)

*Primary Examiner* — Brendan Y Higa

(57) ABSTRACT

A computing device configured for determining a node status is described. The computing device includes a processor and instructions in memory. The computing device determines a representative node corresponding to a network group with multiple nodes. The computing device also sends a status retrieval directive to the representative node. The status retrieval directive includes a directive for retrieval of the node status of a target node. The computing device also receives the node status of the target node from the representative node and stores the node status on a database.

18 Claims, 9 Drawing Sheets

(51) Int. Cl.
*H04L 12/24* (2006.01)
*H04L 29/08* (2006.01)
*H04W 40/24* (2009.01)

(52) U.S. Cl.
CPC ...... *H04L 67/1051* (2013.01); *H04L 67/1063* (2013.01); *H04W 40/24* (2013.01)

(56) References Cited

U.S. PATENT DOCUMENTS

| | | | |
|---|---|---|---|
| 6,470,384 B1* | 10/2002 | O'Brien | H04L 41/0213 707/999.01 |
| 6,970,167 B1* | 11/2005 | Kumamoto | G06F 11/324 345/419 |
| 7,035,918 B1 | 4/2006 | Redding et al. | |
| 7,046,666 B1 | 5/2006 | Bollay et al. | |
| 7,539,191 B1* | 5/2009 | Jacobson | H04L 63/1441 370/392 |
| 7,770,168 B1 | 8/2010 | Howarth | |
| 7,840,662 B1* | 11/2010 | Natanzon | H04L 67/1097 709/209 |
| 7,890,555 B2 | 2/2011 | Gunda | |
| 8,023,898 B2 | 9/2011 | Abedi | |
| 8,611,346 B1 | 12/2013 | Wijnands et al. | |
| 8,838,759 B1 | 9/2014 | Eatough | |
| 9,137,780 B1 | 9/2015 | Olsen et al. | |
| 9,800,423 B1 | 10/2017 | Earl | |
| 10,038,566 B1 | 7/2018 | Olsen | |
| 10,116,526 B2 | 10/2018 | Memmott et al. | |
| 2002/0062375 A1* | 5/2002 | Teodosiu | H04L 29/06 709/226 |
| 2003/0037331 A1 | 2/2003 | Lee | |
| 2003/0091267 A1 | 5/2003 | Alvarez et al. | |
| 2004/0064512 A1* | 4/2004 | Arora | H04L 51/04 709/206 |
| 2004/0105384 A1 | 6/2004 | Gallezot | |
| 2004/0107242 A1 | 6/2004 | Vert et al. | |
| 2004/0186897 A1 | 9/2004 | Knauerhase et al. | |
| 2005/0071457 A1* | 3/2005 | Yang-Huffman | H04L 41/0893 709/224 |
| 2005/0198359 A1 | 9/2005 | Basani et al. | |
| 2005/0259571 A1 | 11/2005 | Battou | |
| 2006/0018333 A1 | 1/2006 | Windisch et al. | |
| 2006/0041615 A1 | 2/2006 | Blank et al. | |
| 2006/0048144 A1 | 3/2006 | Willess et al. | |
| 2006/0072572 A1 | 4/2006 | Ikeda et al. | |
| 2006/0265709 A1 | 11/2006 | Meaney | |
| 2007/0050497 A1 | 3/2007 | Haley et al. | |
| 2007/0082671 A1* | 4/2007 | Feng | H04W 36/0016 455/436 |
| 2007/0116014 A1 | 5/2007 | Shuen et al. | |
| 2007/0118614 A1 | 5/2007 | Bertin | |
| 2007/0140213 A1 | 6/2007 | Milligan et al. | |
| 2007/0156898 A1 | 7/2007 | Appleby et al. | |
| 2007/0177513 A1 | 8/2007 | Kuokkanen | |
| 2007/0258476 A1 | 11/2007 | Habu | |
| 2008/0019291 A1* | 1/2008 | Sienel | H04L 67/104 370/258 |
| 2008/0235373 A1 | 9/2008 | Haley et al. | |
| 2008/0247396 A1 | 10/2008 | Hazard | |
| 2008/0279206 A1 | 11/2008 | Yanagihara | |
| 2009/0070579 A1 | 3/2009 | Murakami et al. | |
| 2009/0077199 A1* | 3/2009 | Emori | H04L 67/24 709/218 |
| 2009/0092113 A1 | 4/2009 | Doshi | |
| 2009/0113034 A1* | 4/2009 | Krishnappa | G06F 15/16 709/223 |
| 2009/0172191 A1 | 7/2009 | Dumitriu et al. | |
| 2009/0177743 A1 | 7/2009 | Ashour et al. | |
| 2009/0303902 A1 | 12/2009 | Liu et al. | |
| 2009/0316699 A1 | 12/2009 | Mark et al. | |
| 2010/0049846 A1* | 2/2010 | Ballette | H04L 67/104 709/224 |
| 2010/0088425 A1 | 4/2010 | Hooda et al. | |
| 2010/0182901 A1 | 7/2010 | Yoon | |
| 2011/0019673 A1 | 1/2011 | Fernandez Gutierrez | |
| 2011/0128910 A1 | 6/2011 | Moriwaki | |
| 2011/0164508 A1 | 7/2011 | Arai et al. | |
| 2011/0298610 A1 | 12/2011 | Etkin et al. | |
| 2012/0072479 A1* | 3/2012 | Pasko | H04L 67/104 709/201 |
| 2012/0158820 A1* | 6/2012 | Bai | G07C 5/008 709/202 |
| 2012/0271895 A1 | 10/2012 | Maenpaa et al. | |
| 2013/0097274 A1* | 4/2013 | Moss | H04L 12/403 709/208 |
| 2013/0218992 A1 | 8/2013 | Rozinov | |
| 2013/0219279 A1 | 8/2013 | Reichmeyer | |
| 2013/0315125 A1 | 11/2013 | Ravishankar et al. | |
| 2014/0010141 A1 | 1/2014 | Kim et al. | |
| 2014/0059154 A1 | 2/2014 | Hotham | |
| 2017/0331708 A1 | 11/2017 | Memmott et al. | |

OTHER PUBLICATIONS

Office Action for U.S. Appl. No. 14/061,015, dated Jan. 26, 2017, 17 pages.
Office Action for U.S. Appl. No. 14/061,015, dated Aug. 9, 2016, 16 pages.
Office Action for U.S. Appl. No. 14/061,015, dated Mar. 16, 2016, 15 pages.
Office Action for U.S. Appl. No. 14/061,015, dated Sep. 22, 2015, 18 pages.
Office Action for U.S. Appl. No. 14/583,531, dated Sep. 11, 2017, 11 pages.
Office Action for U.S. Appl. No. 14/583,531, dated Mar. 30, 2018, 16 pages.
Office Action for U.S. Appl. No. 15/154,733, dated Jan. 18, 2018, 16 pages.
International Search Report and Written Opinion for International Application No. PCT/US2017/032396, dated Aug. 1, 2017, 7 pages.
Office Action for U.S. Appl. No. 13/471,253, dated Dec. 23, 2016, 14 pages.
Office Action for U.S. Appl. No. 13/471,253, dated Mar. 17, 2016, 14 pages.
Office Action for U.S. Appl. No. 13/471,253, dated Jul. 27, 2015, 11 pages.
Office Action for U.S. Appl. No. 13/471,253, dated Sep. 12, 2014, 9 pages.
Office Action for U.S. Appl. No. 13/471,253, dated Sep. 6, 2016, 14 pages.
Office Action for U.S. Appl. No. 13/471,253, dated Nov. 10, 2015, 14 pages.
Office Action for U.S. Appl. No. 13/471,253, dated Feb. 20, 2015, 11 pages.
Office Action for U.S. Appl. No. 14/583,531, dated Dec. 31, 2018, 17 pages.
Office Action for U.S. Appl. No. 14/583,531, dated Jun. 6, 2019, 20 pages.

* cited by examiner

DETERMINING THE STATUS OF A NODE BASED ON A DISTRIBUTED SYSTEM

CROSS-REFERENCE TO RELATED APPLICATION

This application is a continuation of and claims priority to U.S. patent application Ser. No. 13/471,253, entitled "Determining the Status of A Node Based on A Distributed System," filed May 14, 2012, which is hereby incorporated herein by reference in its entirety.

TECHNICAL FIELD

The present disclosure relates generally to computers and computer-related technology. More specifically, the present disclosure relates to determining the status of a node based on a distributed system.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. These computers are often referred to as nodes. One or more servers or computers may provide data, services and/or may be responsible for managing other computers on the network. A computer network may include hundreds or even thousands of nodes.

Networks may often become congested due to the amount of network traffic. For example, as communications attempted over a network increase, network throughput may decrease. As a result, data transmission and reception speeds may decrease, which may cause nodes to perform operations more slowly. In some cases, network failure may even occur. This may cause some node operations to be suspended or aborted. As can be observed from this discussion, systems and methods that help reduce network traffic may be beneficial.

DETAILED DESCRIPTION

Figure 1:
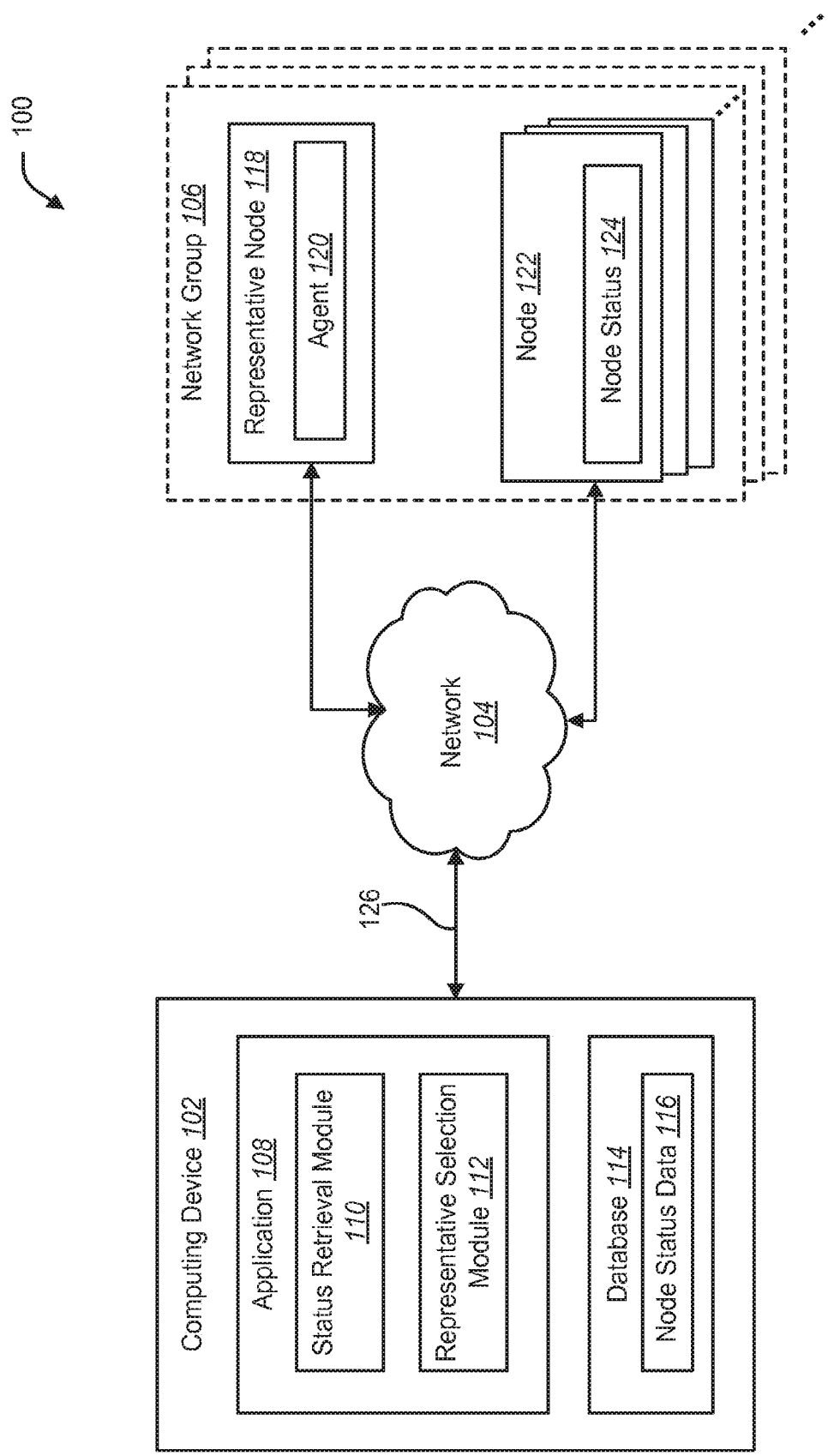
FIG. 1 is a block diagram illustrating one configuration of a system where systems and methods for determining the status of a node based on a distributed system may be implemented.

A computing device configured for determining a node status is described. The computing device includes a processor and instructions stored in memory that is in electronic communication with the processor. The computing device determines a representative node corresponding to a network group. The network group includes a plurality of nodes. The computing device also sends a status retrieval directive to the representative node. The status retrieval directive includes a directive for retrieval of the node status of a target node. The computing device also receives the node status of the target node from the representative node and stores the node status on a database.

The computing device may further receive a request for the node status of the target node corresponding to the network group. The computing device may also send the node status of the target node. The computing device may further determine the representative node in response to receiving a request from a requesting node for the node status of the target node.

The computing device may additionally determine whether a network group has a designated representative node. When the network group does not have a designated representative node, the computing device may also determine the representative node corresponding to the network group.

The computing device may further include an administrative system. The administrative system may be in communication with a plurality of network groups. The computing device may determine a corresponding representative for each network group. The computing device may further communicate with a plurality of nodes by multicasting data to the plurality of nodes over a network.

A method for determining a node status on a computing device is also described. The method includes determining a representative node corresponding to a network group. The network group includes a plurality of nodes. The method also includes sending a status retrieval directive to the representative node. The status retrieval directive includes a directive for retrieval of the node status of a target node. The method also includes receiving the node status of the target node from the representative node. The method also includes storing the node status on a database of the computing device.

A non-transitory tangible computer-readable medium for determining a node status is additionally described. The computer-readable medium includes executable instructions for determining a representative node corresponding to a network group. The network group includes a plurality of nodes. The computer-readable medium also includes executable instructions for sending a status retrieval directive to the representative node. The status retrieval directive includes a directive for retrieval of the node status of a target node. The computer-readable medium also includes executable instructions for receiving the node status of the target node from the representative node. The computer-readable medium also includes executable instructions for storing the node status on a database of a computing device.

The systems and methods disclosed herein describe approaches for determining the status of a node based on a distributed system. There is often a need to determine the status of a device or node on a network. For example, a user or administrator may want to know the status of an identified, visible node or group of nodes in order to retrieve the status or perform a task. A status may provide information about a node, including presence (ping), AV installed, management agent installed, health and other proprietary or global information about the node. However, some difficulties may arise when an administrative system or individual node attempts to determine the status of one or more nodes on a network, which often requires multiple requests or engaging in back-and-forth communication with different nodes and computing devices on a network. Determining the status of multiple nodes may often result in reducing available bandwidth or having a detrimental effect on the functionality of one or more devices. Determining the status of a device or group of devices may also be generally inefficient and time consuming.

Conventional systems use individual consoles to request information about other consoles. In conventional systems, this is generally limited to allowing a user to only get information for devices which were selected or already visible to a specific console. For example, every time a view changes, information and status data would be refreshed, thereby requiring refreshing and further communication between components to acquire data about a specific console.

In an effort to remedy some of these difficulties, the systems and methods disclosed herein may provide a distributive approach for requesting the status of an agent on a device. For example, to limit some of the burden on individual nodes as well as the burden on a system as a whole, a computing device or administrative system may select a representative node to represent a network or subset of devices. To acquire the status of a node on a network or subset of nodes, the computing device may send instructions to the representative node to retrieve the status of a specific node or group of nodes.

A representative node may be selected using various multicast procedures. The computing device may also incorporate procedures for making sure that a representative node is always in place to retrieve status information about any node in a network group. This selection may be by one of many procedures, including an election procedure, a volunteering procedure, an automated algorithm or other procedure for selecting a representative node from a networking group.

Upon selection of a representative node, the system or computing device may maintain a database of node status data for retrieval by other nodes in communication with the computing device. In some configurations, a computing device may periodically retrieve status data from the representative node for maintaining an up-to-date directory of node status data for a corresponding network group. The computing device may store the data on a database for later retrieval. The computing device may further provide the status of a node to a requesting node on the same or different network from the representative node. Furthermore, much of the status information could be placed in a proprietary transmission control protocol (TCP) based packet from the computing device to further reduce network bandwidth consumption.

By selecting a representative node to retrieve the status of other nodes on a network group, requests for the status of a node or group of nodes will have less impact on the functionality of a specific node as well as limiting the impact of a request on the system (e.g., network) as a whole. Having a distributed system allows information to be available to multiple users and enables functionality on slower connections or through a gateway, resulting in greater benefit to the functionality of individual consoles as well as the system as a whole. Further, configurations of systems and methods may be incorporated into products with agents on a device and a database on a computing device.

Various configurations of the systems and methods are now described with reference to the Figures, where like reference numbers may indicate identical or functionally similar elements. The configurations of the present systems and methods, as generally described an illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 where systems and methods for determining the status of a node based on a distributed system may be implemented. A computing device 102 is illustrated in FIG. 1. Examples of the computing device 102 include servers, personal computers (PCs) or other kinds of computing devices. The computing device 102 may include an application 108 with a status retrieval module 110 and a representative selection module 112. The status retrieval module 110 and representative selection module 112 may be hardware and/or software modules used to multicast or distribute data across the network 104 to one or more nodes in a network group 106.

The computing device 102 communicates with one or more nodes in a network group 106 across a network 104. The network 104 may be a computer network such as a Local Area Network (LAN), Wide Area Network (WAN), Internet, Intranet, or other medium for transferring data between various devices. A network group 106 may include one or more nodes grouped according to, for example, a Local Area Network (LAN) or subnet of larger networks. In one configuration, the computing device 102 may communicate with a single network group 106 over a network 104. In another configuration, the computing device 102 may communicate with multiple network groups 106 or network groups 106 that are subnets of other network groups 106 over a network 104.

The computing device 102 further includes a database 114 for storing data related to nodes on the network group 106. For example, in one configuration, the database 114 stores node status data 116 of a node or group of nodes in the network group 106. In another configuration, the database 114 may store other data related to the status or other information requested by a node over the network 104. By storing data on the database 114, the computing device 102 may make node status data 116 and other data visible or otherwise available to nodes from other networks or networking groups that are in communication with the computing device 102.

The network group 106 includes a plurality of nodes. In one configuration, the network group 106 includes a representative node 118 selected by the computing device 102 through the use of the application 108. In some configurations, the representative node 118 includes an agent 120. The network group 106 further includes a node 122 with a node status 124. The node status 124 may be anything to indicate the state of a node 122. For example, the node status 124 may be what a node 122 is currently doing or what is installed on a node 122. A node status may also include presence (ping), AV installed, management agent installed, health, or other proprietary or global information. In some configurations, the network group 106 may include any number of nodes in addition to a representative node 118. In some configurations, the representative node 118 may include a node status 124. In another configuration, an agent 120 is installed on each node in addition to a node status 124 being present for each node of the network group 106.

In some configurations, a node 122 may be a target node indicating a node 122 with a node status 124 that has been requested by the computing device 102 or another node in communication with a network 104. The target node may be a single node corresponding to a network group 106 and a representative node 118. In another configuration, a network group 106 may include one or more multiple target nodes within a network group 106. In another configuration, the system 100 may include multiple target nodes on different devices or network groups, with each target node corresponding to a different representative node 118 and network group 106. Furthermore, any node 122 or representative node 118 may be a target node.

In some configurations, the application 108 may include a representative selection module 112. The representative selection module 112 may be a hardware or software module that can multicast or distribute data across a network 104 to one or more nodes. The representative selection module 112 may further create and implement criteria for selecting a representative node 118 to represent a network group 106. In some configurations, the representative selection module 112 is installed on a computing device 102 with instructions to select a representative node 118 based on certain criteria. In one configuration, the representative selection module 112 interacts with agents 120 of nodes on a network group 106 to select a node to act as a representative node 118 for a corresponding network group 106.

Each of the one or more network groups 106 may include a representative node 118. The representative node 118 may be determined by the computing device 102 using various criteria or procedures as designated by the representative selection module 112. The representative node 118 may be selected by volunteering to represent the nodes in the network group 106. This volunteering may be in response to the computing device 102 detecting a capability of a particular node to act as a representative node, possibly through installation of an agent 120 on the particular node or the presence of particular software to enable the node to act as a representative for the other nodes on the network group 106. In one example, the representative node 118 may be selected based on specifications of the particular node and the effect that a request for node status data 116 will have on the system as a whole. In some configurations, the selection of a representative node 118 may be made using an automatic algorithm (e.g., selecting a node with the highest Protocol (IP) address). In some configurations, a node may determine that a representative node does not exist for a particular network group 106 and volunteer or designate itself as the representative node 118 of the network group 106. In another configuration, the computing device 102 may detect that a representative node 118 has not been determined for a particular network group 106 and determine a representative node 118 based on various criteria or procedures as designated by the representative selection module 112.

In some configurations, the application 108 further includes a status retrieval module 110. The status retrieval module 110 may be a hardware or software module that can multicast or distribute data across a network 104 to one or more nodes. The status retrieval module 110 may further create or maintain a status retrieval directive 126 with accompanying instructions for a representative node 118. In some configurations, the status retrieval module 110 communicates with an agent 120 on a representative node 118. The status retrieval module 110 may further create and/or maintain a status retrieval directive 126 for instructing an agent 120 or representative node 118 to retrieve and communicate a node status or multiple node statuses of nodes in a corresponding network group 106.

In some configurations, the computing device 102 communicates with the representative node 118 by sending a status retrieval directive 126 over the network 104. The status retrieval directive 126 may be created for a specific representative node 118 or network group 106 by a status retrieval module 110 of an application 108 on the computing device 102. The status retrieval directive 126 may include instructions directed at a representative node 118 or agent 120 on the representative node 118 to find and report the node status 124 of a node 122 on the network group 106. The status retrieval directive 126 may include other instructions for the representative node 118 and/or node agent 120. In one example, the status retrieval directive 126 may instruct the representative node 118 to compile and send the node status 124 of each of the nodes on a network group 106 or subgroup. In another example, the status retrieval directive 126 may direct the representative node 118 to find the node status 124 of a subgroup of nodes on a network group 106 and send data back to the computing device 102. In another example, the status retrieval directive 126 may instruct the representative node 118 to periodically send status updates or status changes of nodes on a network group 106 depending on preferences of the computing device 102 or other nodes in communication with the network 104. In other configurations, the status retrieval directive 126 may include other instructions regarding the retrieval and reporting of node status data 116 to a computing device 102 on a distributive system.

In some configurations, a network group 106 may have a target node indicating a node with a node status 124 that has been requested by the computing device 102 or another node in communication with a network 104. In one configuration, the target node may be a single node 122 corresponding to a network group 106 and a representative node 118. In another configuration, a network group 106 may include multiple target nodes that make up a group of nodes within a network group 106. In another configuration, the system 100 may include multiple target nodes on different devices or network groups, and relaying the node status 124 for each target node 122 to a corresponding representative node 118 for each network group 106. Furthermore, in some configurations the representative node 118 may be designated as a target node. For example, a representative node 118 may retrieve a node status 124 of any node 122 in a network group, including a node status 124 of the representative node 118. Also, while not illustrated in FIG. 1, any node 122 in a network group 106 may further include an agent 120 similar to the agent 120 on the representative node 118.

After the representative node 118 has acquired and reported node status data 116 of a node 122 or group of nodes to the computing device 102 pursuant to the instructions of the status retrieval directive 126, the computing device 102 stores the status node data 116 in a database 114. The database 114 may be a central database for multiple computing devices or may be local to a specific computing device such as a server or central computer. For example, while the database 114 may be local to a specific computing device 102, it may also be accessible to other computing devices or any other node in communication with the network 104. The database 114 stores node status data 116 visible or accessible to other nodes in communication with the network 104 or computing device 102. In one configuration, the database stores the node status 124 of one or more nodes on a network group 106 and makes the node status 124 or node status data 116 associated with a node 122 or group of nodes available to other nodes in the same or different network groups.

Figure 2:
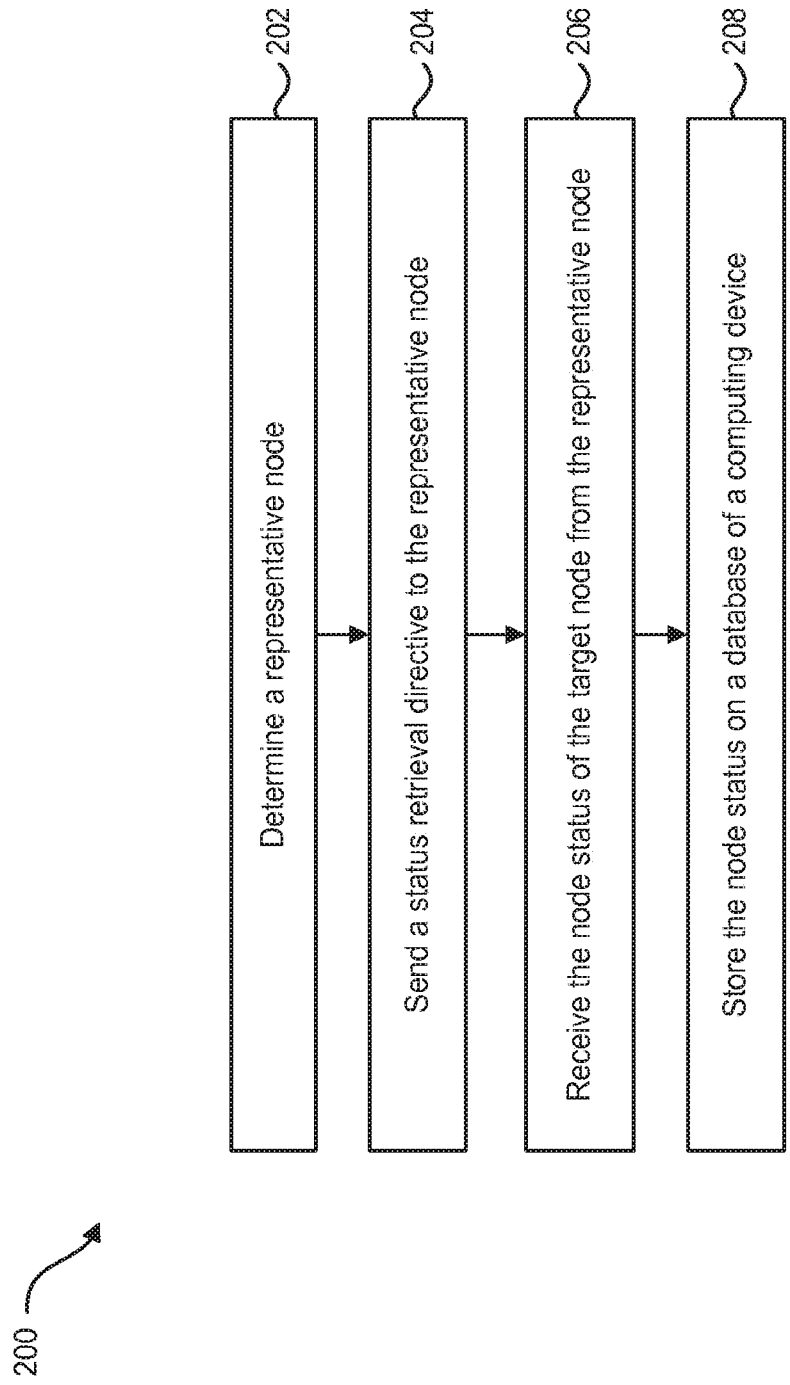
FIG. 2 is a flow diagram illustrating one configuration of a method for determining the status of a node based on a distributed system.

FIG. 2 is a flow diagram illustrating one configuration of a method 200 for determining the status of a node based on a distributed system. The computing device 102 may determine 202 a representative node 118. For example, the computing device 102 selects a representative node 118 or a node volunteers as a representative node. Each representative node 118 represents a specific network group 106 having an agent 120 installed on the representative node 118 to enable functionality as a representative for the network group 106. As discussed previously, the representative node 118 may be selected by the computing device 102 using a variety of methods or criteria. Further, a node may volunteer to be the representative node 118 per software instructions on the node or, in some configurations, the node may volunteer itself or another node in the network group 106 to be the representative node 118 for the corresponding network group 106.

The computing device 102 may send 204 a status retrieval directive 126 to the representative node 118. The status retrieval directive 126 may include instructions for a representative node 118, including a directive to retrieve the node status of a node 122 on the network group 106. In one configuration, the status retrieval directive 126 may include instructions for the representative node 118 to find the node status of a specified group of target nodes. In another configuration, the status retrieval directive 126 may include instructions for the representative node to retrieve each of the node statuses of an entire network group 106, without specifying any single node 122. For example, a computing device 102 may receive a request to view each of the statuses of a network group 106 or subgroup. In one configuration, the status retrieval directive 126 may include the content of that request. For example, the request may include instructions to acquire the node status of each node in the network group 106.

The computing device 102 may receive 206 the node status 124 of a node 122 from the representative node 118. This may be pursuant to the instructions accompanying the status retrieval directive 126, for example. In some configurations, the representative node 118 sends the node status 124 of each of the nodes on the network group 106 to the computing device 102 pursuant to the status retrieval directive 126.

The computing device 102 may store 208 the node status 124 on a database 114. The database 114 may be a central database for multiple computing devices or may be local to a specific computing device 102 such as a server or central computer. The database 114 may store node status data 116 for retrieval by other nodes in communication with the computing device 102 (over a network, for example). In one configuration, the database stores the node status of one or more nodes on a network group 106 and makes the node status or data associated with a node 122 or group of nodes available to other nodes in the same or different network groups. Further, the database 114 may be a single database or multiple databases located on different computing devices 102, so long as the database 114 or multiple databases storing the node status data 116 are accessible on the network 104.

In some configurations, the node status 124, node status data 116 or other data may be placed in a proprietary TCP based packet by the computing device 102. The TCP packet may contain information of when the representative node 118 will attempt to retrieve the status of one or more nodes in a network group 106. In some examples, the time may be determined or by a specified time, schedule or other algorithm. It should be noted that the representative node 118 may be determined in accordance with the systems and methods described herein. The TCP packet may further include information about when to transmit information between the computing device 102 and representative node 118 to be saved in the database 114 based on a specified time, schedule or other algorithm. In some configurations, the information from the TCP packet may be cached on the representative node 118 to be retrieved or transferred between the representative node 118 and the computing device 102 on a schedule or upon request. In some configurations, using a TCP packet may reduce network traffic because information may be retrieved on a just in time or as needed basis from a cached source. The TCP packet may further reduce network traffic where information is retrieved in real time on a distributed system, where a representative node 118 reports to the computing device 102. For example, resources on the computing device 102 may be freed up by only reporting changed node status 124 information. In some configurations, this may be accomplished quickly (e.g., without timeouts) since the data may be accessed from a cached source. This may permit improved performance for a computing device 102 that has a slow or limited connection to a representative node 118 (where timeouts may be problematic, for example), where the representative node 118 has a fast connection to nodes that it represents.

Figure 3:
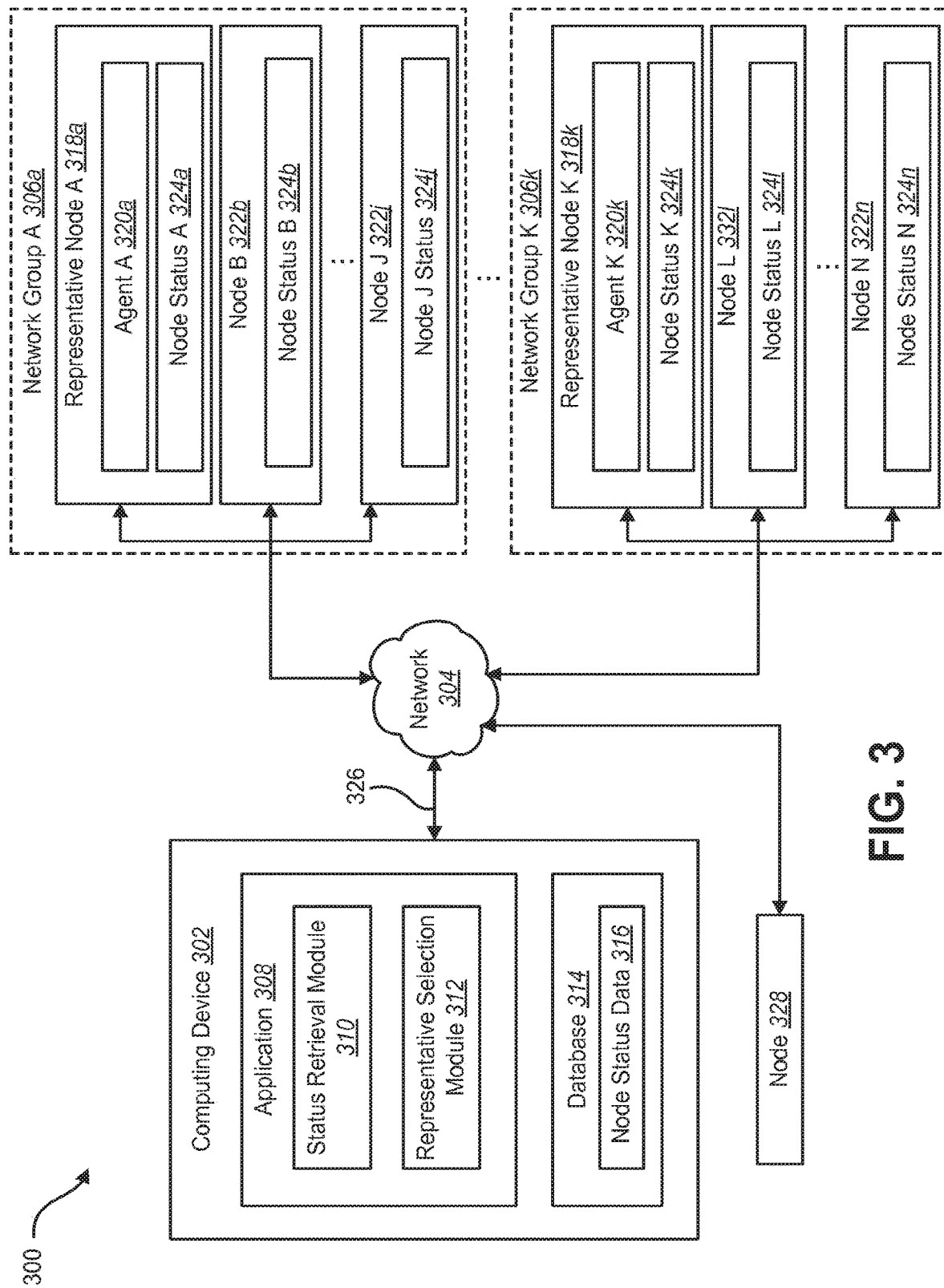
FIG. 3 is a block diagram illustrating another configuration of a system where systems and methods for determining the status of a node using a distributed system may be implemented.

FIG. 3 is a block diagram illustrating another configuration of a system 300 where systems and methods for determining the status of a node based on a distributed system may be implemented. The system 300 includes a computing device 302 with an application 308 having a status retrieval module 310 and a representative selection module 312. The computing device 302 further includes a database 314 which may be in communication with a plurality of network groups 306 over a network 304. The network 304 may be a central network connecting multiple network groups, each network group having one or more nodes in communication with one or more computing devices 302. The status retrieval module 310 and representative selection module 312 may each be part of an application 308. In some configurations, the representative selection module 312 interacts with each network group 306a-k and selects corresponding representative nodes 318a-k. The status retrieval module 310 may interact with one or more representative nodes 318 and send instructions for retrieving node status data 316 corresponding to one or more nodes 322.

Some configurations include a plurality of network groups 306a-k. In the illustrated configuration, network group A 306a includes representative node A 318a corresponding to network group A 306a. Representative node A 318a includes agent A 320a and node status A 324a. Network group A 306a further includes a plurality of nodes 322b-j, each with a corresponding node status 324b-j. Additionally, network group K 306k includes one or more nodes 3221-n with corresponding node statuses 3241-n and representative node K 318k including agent K 320k and node status K 324k. In some configurations, each of the nodes 322 may include an agent (similar to agents 320 included in the representative nodes 318, for example) and be capable of functioning as a representative node instead of the representative node(s) 318 illustrated. For example, a node 322 may be a representative node if it meets the criteria for selection as a representative node for a network group 306. Network group A 306a may further include any number of nodes 322b-j, each having a corresponding node status 324b-j. In some configurations, each node 322 is in communication with the computing device 302 over the network 304. In another configuration, each node 322 may be in communication with the representative node 318 for its respective network group 306. In some configurations, one or more nodes 322 may have access to or visibility of the database 314 on the computing device 302.

In one configuration, the computing device 302 sends a status retrieval directive 326 to representative node A 318a with instructions regarding one or more of the node statuses 324a-j of one or more nodes 318a, 322b-j on network group A 306a. In some configurations, the status retrieval directive 326 may be in response to a request from a node 322 or representative node 318 in a network group 306 in communication with the computing device 302. Additionally or alternatively, the status retrieval directive 326 may be in response to a request from another node 328. For example, another node 328 may request the node status 324a-j of one or more nodes 318a, 322b-j on network group A 306a by sending a request to the computing device 302. The computing device 302 may retrieve corresponding node status data 316 from the database 314 (if available, for example). The computing device 302 may also send the node status data 316 to the requesting node (e.g., the other node 328, a representative node 318a, 318k, a node 322b-j, 3221-n, etc.). Alternatively, the computing device 302 could send a status retrieval directive 326 to representative node A 318a with instructions to retrieve and report one or more node statuses 324a-j corresponding to the status retrieval directive 326. In some configurations, the status retrieval directive 326 may be a periodic directive for determining the presence of a representative node 318 and instructing a representative node 318 to determine and report the node status 324 of each of the nodes in a network group 306. In this way, the computing device 302 may maintain an up-to-date database 314 of node status data 316 corresponding to one or more node statuses 324a-n of nodes 318, 322 on a network 304.

The distributed system 300 for determining the status of a node 318, 322 may include any number of network groups 306a-k in communication with the computing device 302. In one configuration, each of the network groups 306 have a corresponding representative node 318. Each representative node 316 may be selected from the same or different criteria as other representative nodes 316 on other network groups 306. Each representative node 318 serves as a representative for other nodes 322 that make up a network group 306 and is capable of receiving and executing a status retrieval directive 326 with accompanying instructions.

Figure 4:
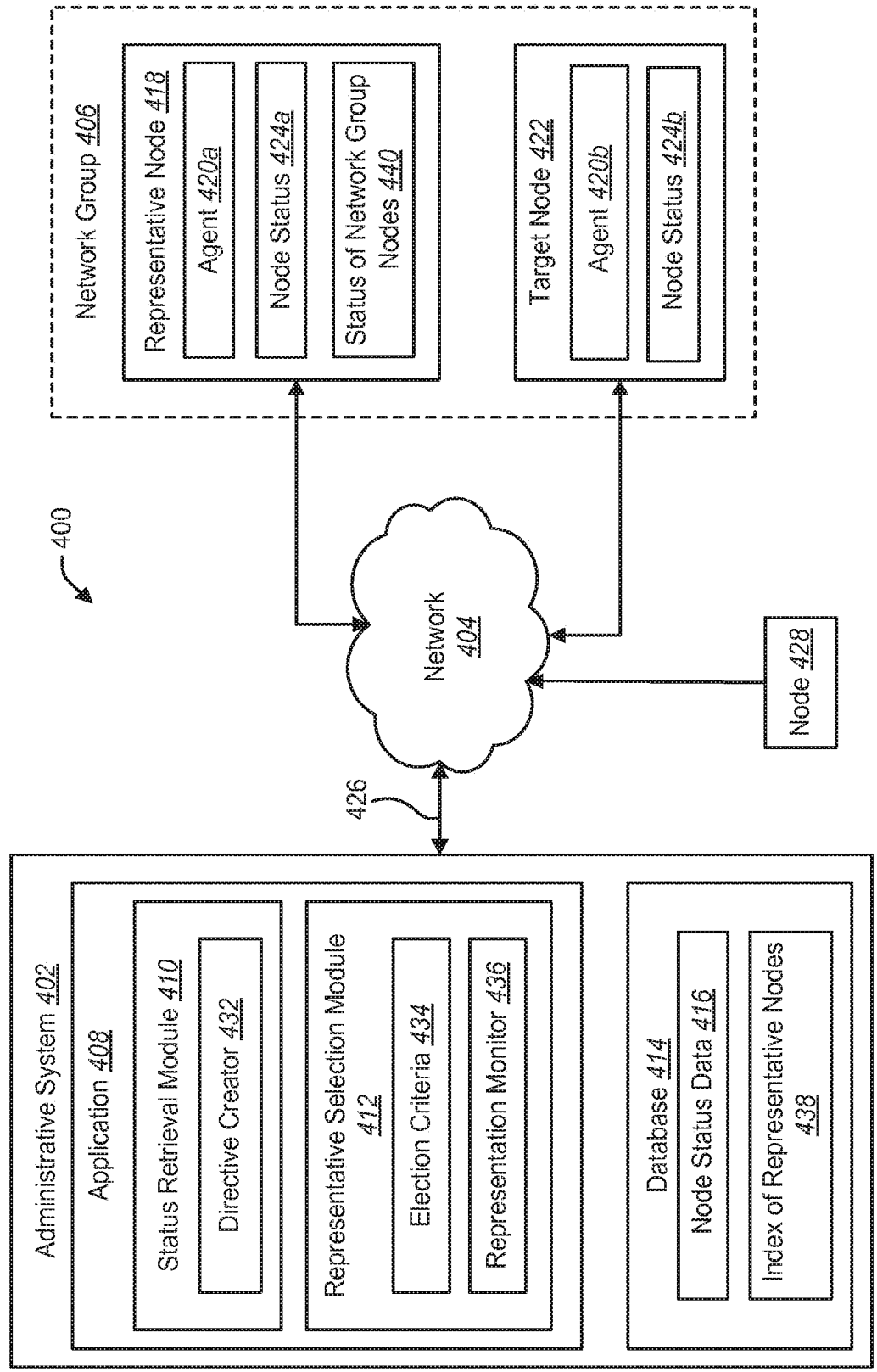
FIG. 4 is a block diagram illustrating another configuration of a system where systems and methods for determining the status of a node based on a distributed system may be implemented.

FIG. 4 is a block diagram illustrating another configuration of a system 400 where systems and methods for determining the status of a node based on a distributed system may be implemented. The system 400 includes an administrative system 402. The administrative system 402 may be any computing device, server, or central system in communication with one or more network groups 406 (e.g., subnets). The administrative system 402 includes an application 408 and a database 414.

The application 408 may be a hardware and/or software module used to multicast data across a network 404 to nodes on a network group 406. The application 408 may further include a status retrieval module 410 and a representative selection module 412. One configuration of the representative selection module 412 includes election criteria 434 for selecting a representative node 418 to represent a corresponding network group 406. For example, election criteria 434 may be the ability to function as a representative node 418 for a specific network group 406. In another configuration, election criteria 434 may be the presence of or ability to download an agent 420 onto the node, enabling certain types of functionality of the representative node 418. In another configuration, the representative node 418 may be selected based on the specifications of the particular node and/or the effect that a request for node status 416 will have on the available bandwidth of the network 404. In some configurations, the selection of a representative node 418 may be made using an automatic algorithm (e.g., selecting a node with the highest Protocol (IP) address). In some configurations, a node with an agent 420 may be able to determine that a representative is lacking in a particular network group 406 and designate itself or volunteer to represent the group as a representative node 418.

One configuration of the representative selection module 412 may include a representative monitor 436 for monitoring the status and/or presence of a representative node 418 on a network group 406. For example, due to a change in status or location of a representative node 418, the representative monitor 436 may be configured to detect an absence of a representative node 418 for a specific network group 406. Upon detection of an absence or a need for a representative node 418 for a network group 406, the representative monitor 436 may instruct the representative selection module 412 or the application 408 to select a representative node 418 for the network group 406. In some configurations, this prompting for selection of a representative node 418 may be in response to a request from a node on the network 404. The decision to select a representative node 418 may be automatic or in response to other factors considered by the administrative system 402, for example. In some configurations, the administrative system 402 may determine to obtain or update node status data 416 without a request from another node. This could be based on a schedule, time period or other trigger (e.g. user input).

The application 408 may further include a status retrieval module 410 for preparing and sending a status retrieval directive 426 to a representative node 418. The status retrieval module 410 may further include a directive creator 432 for creating instructions for a representative node 418 or recognizing a need for a status retrieval directive 426 to be sent to the representative node 418. As discussed in some detail above, the status retrieval directive 426 may include instructions for a representative node 418 to retrieve and report status data of a target node 422 within the same network group 406. In some configurations, the status retrieval directive 426 may include instructions to gather the status data of each of the nodes in a network group 406 or subset of nodes within a network group 406 and send the node status data 416 to the administrative system 402. In other configurations, the status retrieval directive 426 may include other directions or instructions associated with determining and reporting the status of nodes in a corresponding network group 406. In yet other configurations, the status retrieval directive 426 may be an indicator that requests one or more node statuses (that have changed since a prior report, for example).

The administrative system 402 further includes a database 414. The database 414 may be used to store node status data 416 of one or more nodes in communication with the administrative system 402. The node status data 416 may include data related to each node on a network 404. For example, the node status data 416 may include the node status 424 of one or more nodes in a network group 406. The node status data 416 may include data about a representative node 418 of a network group 406, or other data related to the ability of a node to act as a representative node. In some configurations, the database 414 stores the latest known status of each of the nodes in communication with the network 404. The database 414 may further include an index of representative nodes 438 including the accompanying node status data 416 for each of the nodes. The node status data 416 may then be made available to any node on the network 404 upon request and/or the decision of the administrative system 402 to transmit the node status data 416 to another node on the network 404. In some configurations, the application 408 may detect discrepancies between the reported node status of nodes on the network 404 and the node status data 416 stored on the database 414. In this case, the administrative system 402 may update the node status data 416 in the database 414. In some configurations, the representative node 418 may monitor and detect changes in the node statuses 424 of one or more nodes 418, 422. When a change is detected, for example, the representative node 418 may report only those statuses that have changed to the administrative system 402.

The network group 406 includes a representative node 418 and one or more other nodes. In some configurations, the network group 406 includes a target node 422. The target node 422 may be any node in a network group 406 with a node status 424. For example, a target node 422 may be a node that a representative node 418 accesses or communicates with to get the node status 424 of that node. In some configurations, the target node 422 may include an agent 420b and a node status 424b similar to an agent 420a and node status 424a on the representative node 418. In some configurations, each of the nodes communicating with the administrative system 402 has an agent 420. In other configurations, only the representative node 418 or a subset of nodes on the network group 406 have an agent 420. In some configurations, the representative node 418 also includes a node status 424a and a status of network group nodes 440 readily accessible to the representative node 418 or stored on a database 414 on the representative node 418. For example, the status of network group nodes 440 could include an index or list of each node in a network group 406 with corresponding node status data. Other nodes in a network group 406 may include each of the components described in relation to the representative node 418. In other configurations, each of the nodes in the network group 406 may include less than or a subset of the different node components described herein. The system 400 may further include a node 428 not in a particular network group 406, such as a requesting node or other node seeking access to the node status 424 of a target node 422. In some configurations, the representative node 418 may store or cache data related to the node status 424 of one or more nodes using a TCP packet.

Figure 5:
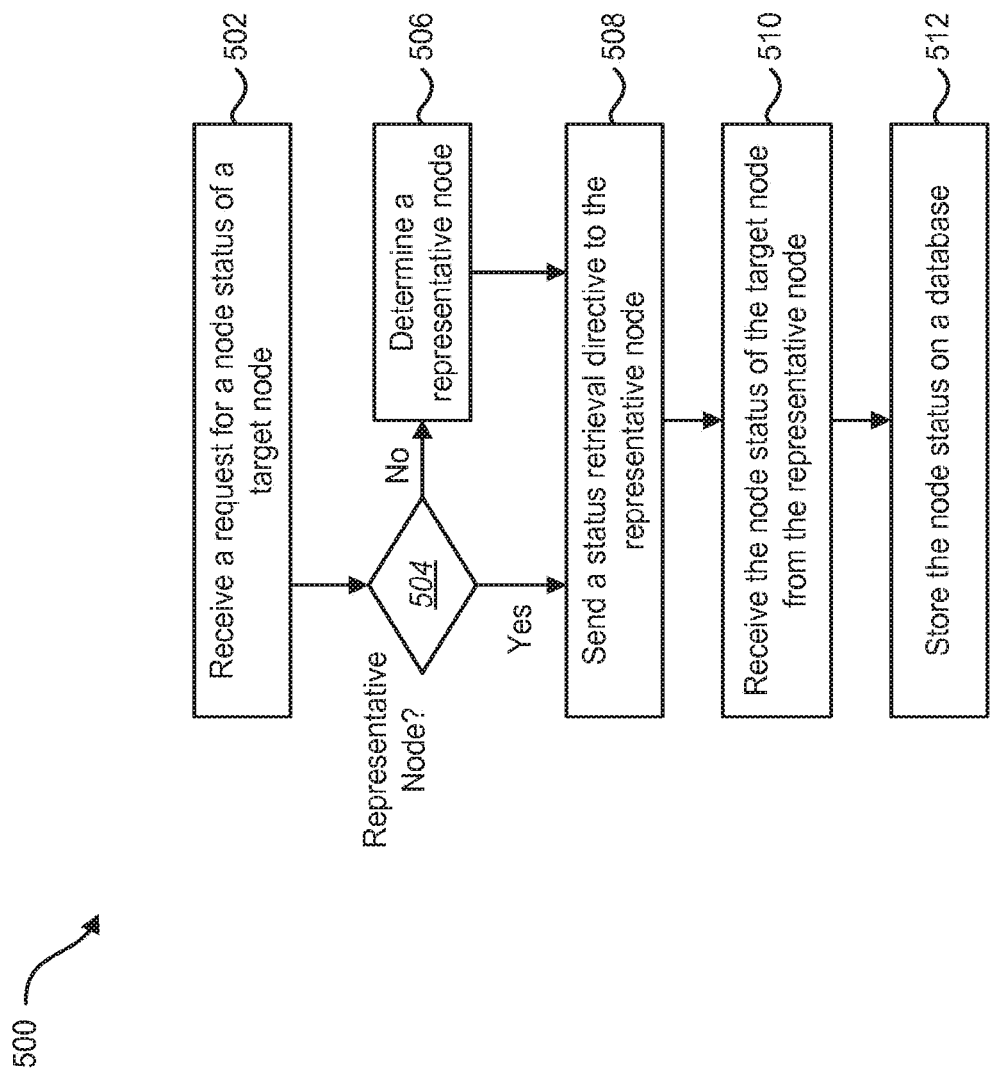
FIG. 5 is a flow diagram illustrating another configuration of a method for determining the status of a node based on a distributed system.

FIG. 5 is a flow diagram illustrating another configuration of a method 500 for determining the status of a node based on a distributed system. In one configuration, the administrative system 402 receives 502 a request for a node status 424 of a target node 422. This request may be received from a node on a network 404. Alternatively, the administrative system 402 may determine to obtain or update node status data 416 without a request from another node. This could be based on a schedule, time period or other trigger (e.g. user input). The administrative system 402 may determine 504 whether a network group 406 has a designated representative node. For example, the administrative system 402 may check a record (e.g., database) that indicates whether a representative node exists for a network group 406. Additionally or alternatively, the administrative system 402 may query one or more nodes in a network group 406 to determine whether a representative node is assigned. In some configurations, the administrative system may make this determination 504 in response to a received 502 request.

If the network group 406 does not have a designated representative node, the application 408 determines 506 a representative node 418 based on a criteria decided upon by the administrative system 402. The criteria for selecting a node may be by way of a volunteer node, an automatic algorithm, or other criteria discussed herein. Further, as discussed above, the criteria for selecting a node may be contained within a representative selection module 412 within an application 408 on the administrative system 402.

Once a representative node 418 has been selected or it has been determined that a representative node 418 already exists, the administrative system 402 sends 508 a status retrieval directive 426 to the representative node 418. The status retrieval directive 426 may be created by the application 408 and include instructions to a representative node 418 regarding the node status 424 of a target node 422 or group of nodes on the network group 406. The representative node 418 may be configured to execute the status retrieval directive 426 or have an agent 420a installed on the representative node 418 configured to receive the status retrieval directive 426 and execute the instructions as set forth by the administrative system 402.

In one configuration, the administrative system 402 receives 510 the node status 424 of the target node 422 from the representative node 418. After receiving the node status 424 from the representative node 418 pursuant to the status retrieval directive 426, the administrative system stores 512 the node status on a database 414. In some configurations, the administrative system 402 receives 510 the node status 424 of one or more nodes on the network group 406 and stores the node status 424 on a database 414 for future retrieval by a requesting node. In some configurations, the selection of a representative node 418 and the receiving and storage of the node status of a target node 422 or group of nodes is done prior to the reception of a request for the node status by a node on the network 404. In other configurations, the selection of a representative node 418 is done in response to a request for the node status 424 of a target node 422 from a requesting node on the network 404. In some configurations, the representative node 418 may maintain a cache of data related to the node status 424 of one or more nodes and prepare the data to be transmitted to the administrative system 402. In one example, the representative node 418 may maintain and prepare the data for transmittal by placing the data in a TCP based packet.

Figure 6:
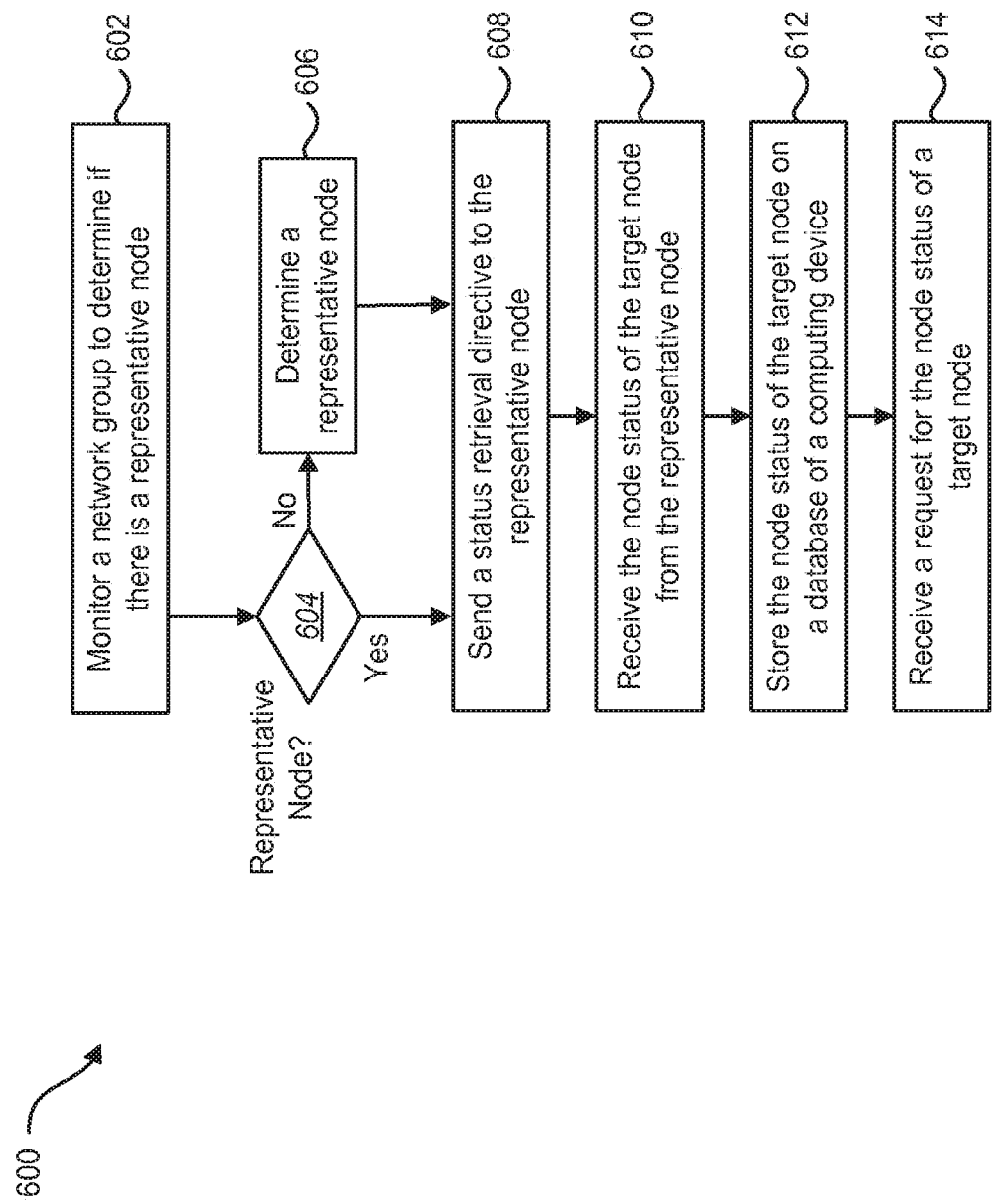
FIG. 6 is a flow diagram illustrating another configuration of a method for determining the status of a node based on a distributed system.

FIG. 6 is a flow diagram illustrating another configuration of a method 600 for determining the status of a node based on a distributed system. In one configuration, the administrative system 402 monitors 602 a network group 406 to determine if there is a representative node 418. Monitoring the presence or existence of a representative node 418 on a network 404 may be performed by the administrative system 402 by periodically checking representative nodes 418 in various network groups 406 or by interacting with agents 420 installed on nodes within each network group 406.

Similar to other configurations described herein, the administrative system 402 determines 604 whether a network group 406 has a designated representative node. If the network group 406 does not have a designated representative node, the administrative system 402 determines 606 a representative node 418 to represent the network group 406 in the distributed system.

Once a representative node 418 has been determined or it has been determined that a representative node 418 already exists, the administrative system 402 sends 608 a status retrieval directive 426 to the representative node 418 similar to the status retrieval directive 426 described in other configurations herein. After processing the status retrieval directive 426, the administrative system 402 receives 610 the node status 424 of the target node 422 from the representative node 418. Receiving the node status 424 may be performed by the administrative system 402 similar to other configurations described herein.

After receiving the node status 424 as directed by the status retrieval directive 426, the administrative system stores 612 the node status 424 on a database 414. In some configurations, the administrative system 402 receives 610 the node status 424 of one or more nodes on the network group 406 and stores the node status 424 on a database 414 for future retrieval by a requesting node. In the illustrated configuration, the administrative system 402 receives 614 a request for the node status 424 of a target node 422 (from a requesting node, for example). The administrative system 402 may also send the node status 424 of the target node 422 (to the requesting node, for example). In some configurations, the requesting node may determine the status of the target node 422 from the administrative system 402 by viewing the node status data 416 on the database 414 where the node status 424 of the target node 422 has already been retrieved and stored on the database 414. In some configurations, the requesting node may trigger the application 408 to send a request for the node status 424 of one or more nodes by sending a node status request to the administrative system 402.

Figure 7:
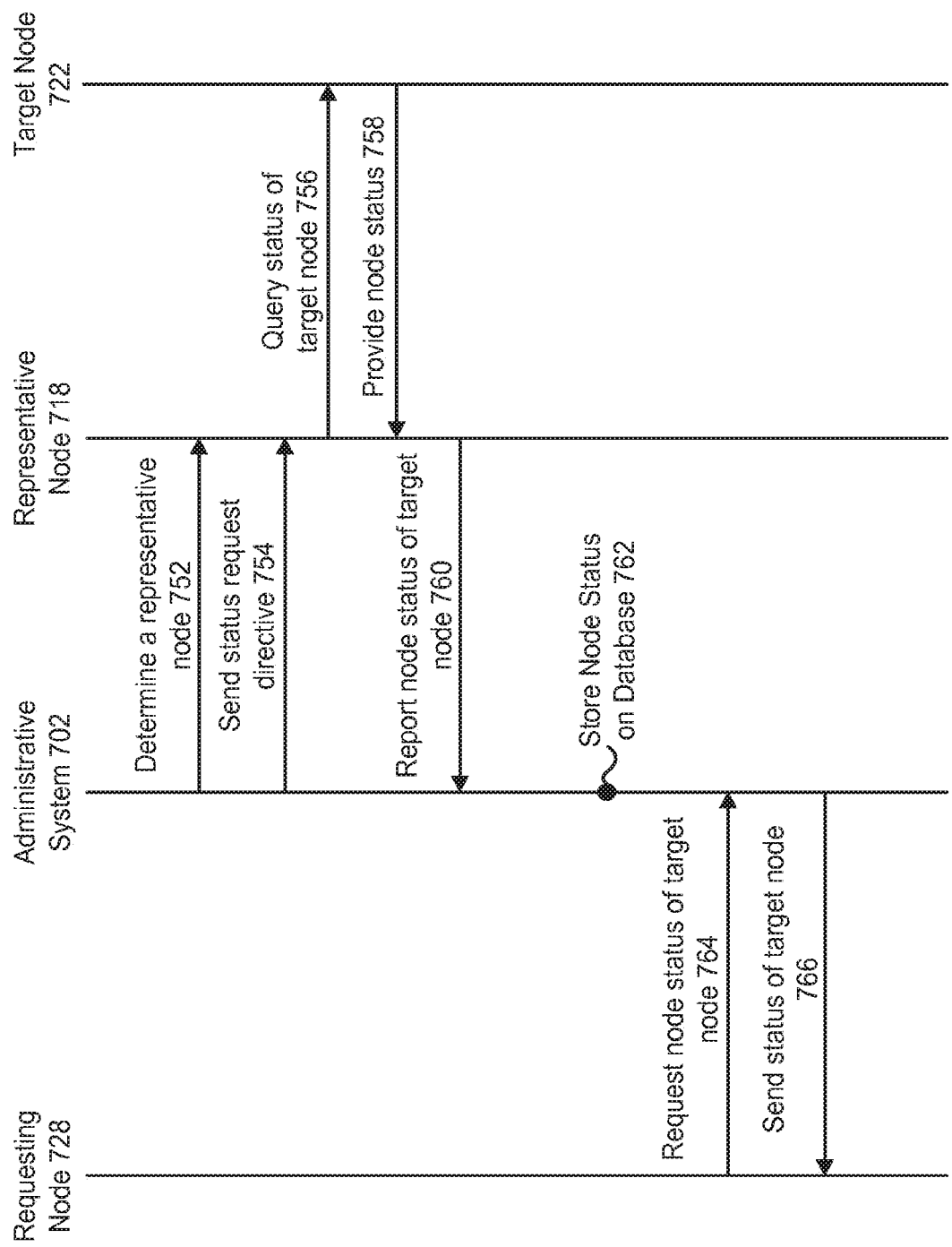
FIG. 7 is a diagram illustrating examples of determining the status of a node based on a distributed system.

FIG. 7 is a diagram illustrating examples of determining the status of a node based on a distributed system. In one configuration, an administrative system 702 determines 752 a representative node 718. As discussed herein, this procedure may be performed by a representative selection module 412 on the administrative system 702. The representative selection module 412 may use any number of criteria for selecting a representative node 418, including IP address, selecting a volunteering node, detecting the presence or installation of an agent 420, specifications of a particular candidate node, or other criteria. In one configuration, a node in a network group 406 may determine or detect that a representative node 718 does not exist for a corresponding network group 406 and designate itself or another node in the network group 406 to be the representative node 718. Other approaches may be used for determining or selecting a representative node 718, including other approaches described herein.

Once a representative node 718 is determined, the administrative system 702 may send 754 a status retrieval directive 426 to the representative node 718. In some configuration, the administrative system 702 includes a status retrieval module 410 for creating and/or preparing the status retrieval directive 426 to be sent to the representative node 418. As discussed previously herein, the status retrieval directive 426 may include instructions for a representative node 418 to retrieve and report the status of one or more nodes. As part of the status request directive 426, the representative node 718 may be instructed to query 756 the status of a target node 722 or group of nodes on a network group 406. In some configurations, the representative node 718 may be able to view the node status 424 of one or more nodes in a network group 406. In another configuration, the representative node 718 may request or instruct a target node 722 to provide 758 the node status 424 of the target node 722 to the representative node 718. This query of node status 424 of the target node 722 may be over the network 404 or another network that permits communication between the representative node 718 and the target node 722. In some configurations, the agents 420 on each node may permit the representative node 718 and the target node 722 to communicate or retrieve node status data 416 to send to the administrative system 702. In one configuration, the representative node 718 may instruct the target node 722 to send the node status 424 of the target node 722 to the administrative system 702. After receiving or otherwise retrieving the node status 424 of the target node 722, the representative node 718 reports 760 the node status 424 of the target node 722 or group of nodes to the administrative system 702.

In some configurations, the administrative system 702 stores 762 the node status 424 or other status data 416 of one or more nodes on a database 414. As discussed previously, the database 414 may be a central database for multiple devices and/or may be local to the administrative system 402. The database 414 stores the node status data 416 for retrieval by other nodes in one or more network groups 406 that may or may not have direct access to the target node 722 or other node with the corresponding node status data 416. The administrative system 702 may make the node status data 416 available to other nodes in communication with the network 404 without requiring an additional inquiry directed to the target node 722. In some configurations, the node status data 416 may be made available to other nodes on the network 404 without further communication with the representative node 718.

In some configurations, the administrative system 702 may communicate with a requesting node 728 over the network 404. The requesting node 728 may request 764 the node status 424 of one or more nodes on a network 404 by sending a status request to the administrative system 702. The node request may be a request for a specific node status 424 of a target node 722 or for the node status 424 of multiple target nodes 422 on the network 404. In one configuration, a requesting node 728 may request the status of one or more nodes on different network groups 406. In some configurations, the administrative system 702 draws from the database 414 to retrieve the requested status data 424 for the requesting node 728. In another configuration, the administrative system 702 may communicate the request as part of the status request directive 426 sent to one or more representative nodes with access to the target node 722 or group of nodes. Once the node status 424 of the target node 722 is retrieved by the administrative system 702, the administrative system 702 sends 766 the node status 424 of the target node 722 to the requesting node 728.

Figure 8:
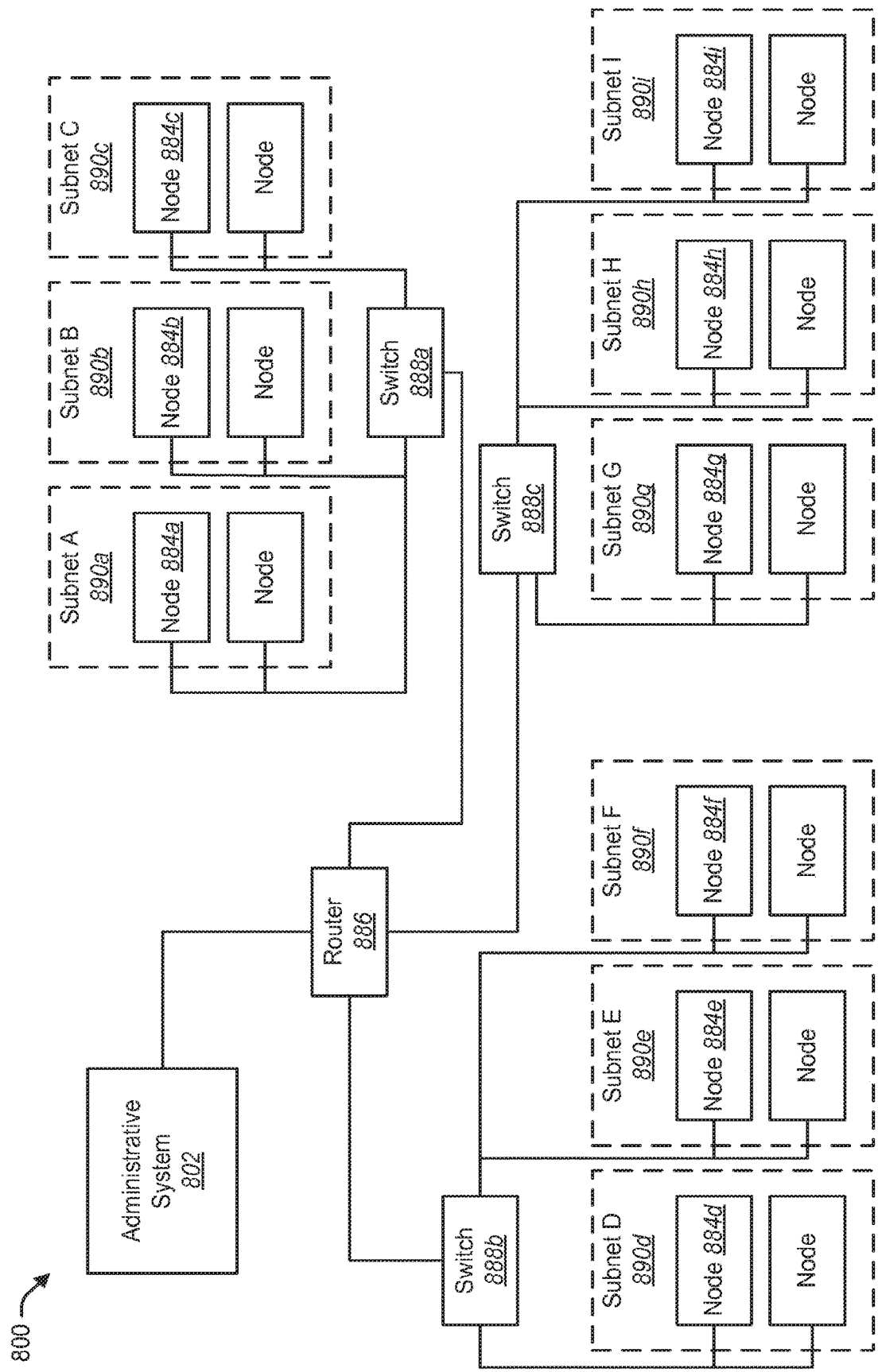
FIG. 8 is a block diagram that illustrates one configuration of a network where a system for determining the status of a node based on a distributed system may be implemented.

FIG. 8 is a block diagram that illustrates one configuration of a network where a system for determining the status of a node based on a distributed system may be implemented. An administrative system 802 is connected to a router 886. The router 886 is connected to switches 888a, 888b, 888c. The switch 888a is connected to several nodes 884a, 884b, 884c, etc. via their respective subnets 890a, 890b, 890c. The switch 888b is connected to several nodes 884d, 884e, 884f, etc. via their respective subnets 890d, 890e, 890f. The switch 888c is connected to several nodes 884g, 884h, 884i, etc. via their respective subnets 890g, 890h, 890i. Although FIG. 8 only shows one router 886, and a limited number of switches 888, subnets 890 and nodes 884, many and varied numbers of routers 886, switches 888, subnets 890 and nodes 884 may be included in networks and/or systems where systems and methods for determining the status of a node based on a distributed system may be implemented. One or more of the nodes 884 illustrated in FIG. 8 may be examples of one or more of the nodes 118, 122, 318, 322, 328, 418, 422, 428, 728, 722 described above.

Figure 9:
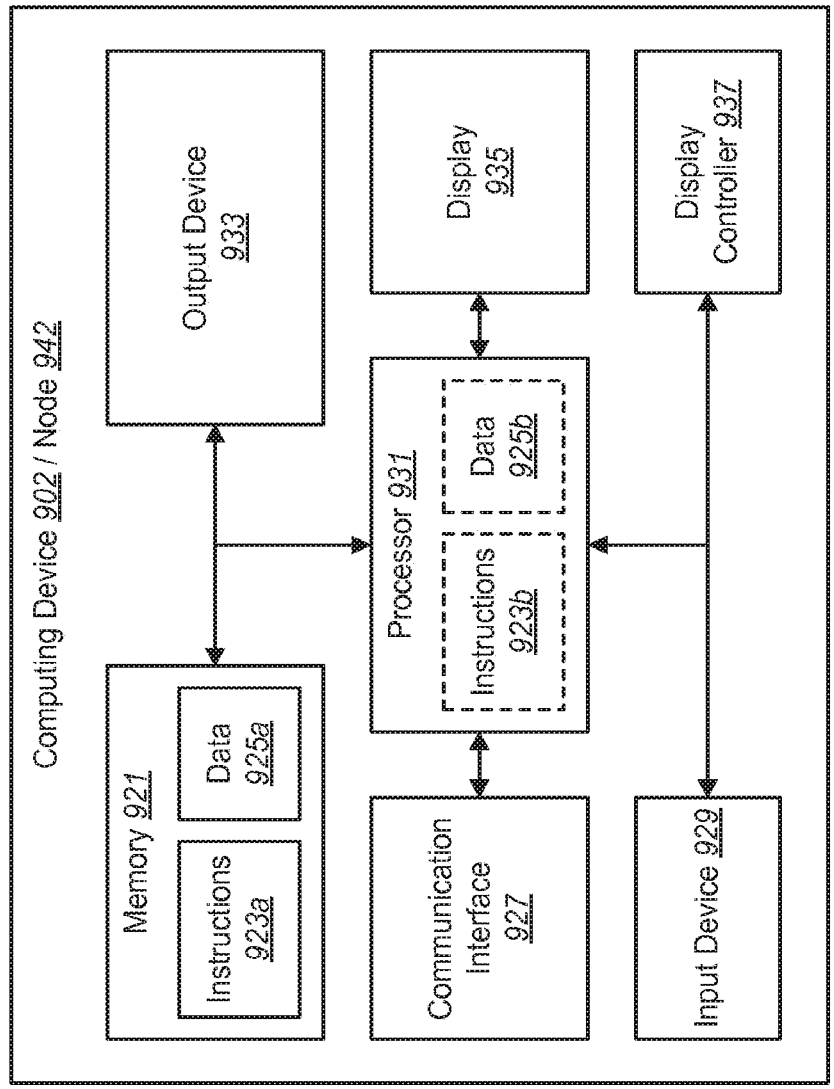
FIG. 9 is a block diagram that illustrates one configuration of a computing device and/or node that may be utilized for determining the status of a node based on a distributed system.

FIG. 9 is a block diagram that illustrates one configuration of a computing device 902 and/or node 942 that may be utilized for determining the status of a node based on a distributed system. The illustrated components may be located within the same physical structure or in separate housings or structures. One or more of the computing devices 102, 302, administrative systems 402 702, 802 and nodes 118, 122, 318, 322, 328, 418, 422, 428, 722, 728, 884 described above may be implemented in accordance with the computing device 902 and/or node 942 illustrated in FIG. 9.

The computing device 902 and/or node 942 may include a processor 931 and memory 921. The memory 921 may include instructions 923a and data 925a. The processor 931 controls the operation of the computing device 902 and/or node 942 and may be, for example, a microprocessor, a microcontroller, a digital signal processor (DSP) or other device known in the art. The processor 931 typically performs logical and arithmetic operations based on program instructions 923b and/or data 925b it loads from the memory 921. The instructions 923a-b may be executable by the processor to implement one or more of the methods 200, 500, 600 described above.

The computing device 902 and/or node 942 typically may include one or more communication interfaces 927 for communicating with other electronic devices. The communication interfaces 927 may be based on wired communication technology, wireless communication technology, or both. Examples of different types of communication interfaces 927 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 902 and/or node 942 typically may include one or more input devices 929 and one or more output devices 933. Examples of different kinds of input devices 929 include a keyboard, mouse, microphone, remote control device, button, joystick, trackball, touchpad, lightpen, etc. Examples of different kinds of output devices 933 include a speaker, printer, etc. One specific type of output device that may be typically included in a computer system is a display device 935. Display devices 935 used with configurations disclosed herein may utilize any suitable image projection technology, such as a cathode ray tube (CRT), liquid crystal display (LCD), light-emitting diode (LED), gas plasma, electroluminescence or the like. A display controller 937 may also be provided, for converting data stored in the memory 921 into text, graphics and/or moving images (as appropriate) shown on the display device 935.

Of course, FIG. 9 illustrates only one possible configuration of a computing device 902 and/or node 942. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus, comprising:
   a memory; and
   a processor associated with a compute device and operatively coupled to the memory, the processor configured to:
   select a first node from a plurality of nodes of a network group to be a representative node based on election criteria, wherein the election criteria include whether the first node has volunteered to be the representative node responsive to a determination by the first node that no representative node exists in the network group;
   generate a status retrieval directive to retrieve a status of a second node from the plurality of nodes;
   send the status retrieval directive to the first node such that the first node, in response to receiving the status retrieval directive, determines the status of the second node and sends an indication of the status of the second node to the compute device;
   receive, from the first node, the indication of the status of the second node; and
   store the indication of the status of the second node in a database, wherein the database is configured such that the status of the second node is available to remaining nodes of the plurality of nodes without an additional inquiry directed to the second node or further communication with the first node.

2. The apparatus of claim 1, wherein the processor is further configured to:
   receive, from a third node from the plurality of nodes, a request for the status of the second node;
   retrieve the indication of the status of the second node from the database; and
   send the indication of the status of the second node to the third node.

3. The apparatus of claim 1, wherein the election criteria further include an ability of the first node to install an agent, a network address associated with the first node, or a specification of the first node.

4. The apparatus of claim 1, wherein:
   the plurality of nodes is a first plurality of nodes,
   the network group is a first network group,
   the processor is further configured to select, from a second plurality of nodes in a second network group, a representative node to represent the second plurality of nodes, and
   selection of the representative node to represent the second plurality of nodes being based on another election criteria, that is different from the election criteria to select the representative node from the first plurality of nodes.

5. The apparatus of claim 1, wherein the processor is configured to send the status retrieval directive repeatedly to the first node such that the first node repeatedly:
   determines the status of the second node; and
   sends the indication of the status of the second node to the compute device.

6. The apparatus of claim 1, wherein the processor is configured to generate the status retrieval directive to include an instruction to send the indication of the status of the second node to the compute device in response to detecting any changes in the status of the second node, such that the first node, in response to receiving the status retrieval directive, is further configured to:
   monitor the status of the second node; and
   send the indication of the status of the second node to the compute device when the first node detects a change in the status of the second node.

7. The apparatus of claim 1, wherein:
   the network group is a first network group; and
   the processor is further configured to:
   receive, from a third node in a second network group different from the first network group, a request for the status of the second node;
   generate the status retrieval directive in response to receiving the request for the status from the third node; and
   send, in response to receiving the indication of the status of the second node form the first node, the indication of the status of the second node to the third node.

8. An apparatus, comprising:
   a memory; and
   a processor associated with a node configured to be included in a plurality of nodes in a network group and operatively coupled to the memory, the processor configured to:
   detect that a representative node does not exist in the network group;
   designate the node as the representative node for the plurality of nodes responsive to detecting that the representative node does not exist; and
   after designating the node as the representative node:
   receive a status retrieval directive requesting status information associated with the plurality of nodes;
   monitor, for each node from the plurality of nodes, status information associated with each node;
   detect, based on the monitoring, a change in status information associated with a set of nodes from the plurality of nodes; and send, in response to detecting the change in the status information, information indicating the change in the status information to a compute device such that the compute device stores the status information in a database accessible by each node from the plurality of nodes without further communication to the node or an inquiry directed to the set of nodes.

9. The apparatus of claim 8, wherein the processor is further configured to install an agent on the node that enables the node to be configured as the representative node for the plurality of nodes.

10. The apparatus of claim 8, wherein the monitoring includes periodically sending a query to each node of the plurality of nodes other than the representative node, wherein the query is configured to request status information associated with each node be sent to the representative node.

11. The apparatus of claim 8, wherein:
the node is a first node from the plurality of nodes and includes a first agent, and
the monitoring includes retrieving, using a communication link established between the first agent and a second agent of a second node from the plurality of nodes, status information associated with the second node.

12. The apparatus of claim 8, wherein the status information associated with each node from the plurality of nodes includes at least one of: a presence of each node from the plurality of nodes, a type of software installed on each node from the plurality of nodes, a health condition of each node from the plurality of nodes, or proprietary information associated with each node from the plurality of nodes.

13. The apparatus of claim 8, wherein the processor is configured to send the information indicating the change in the status information to the compute device such that the compute device, in response to receiving the information indicating the change in the status information, updates a stored status associated with the set of nodes based on the change in the status information.

14. The apparatus of claim 8, wherein the processor is configured to designate itself as the representative node when remaining nodes from the plurality of nodes are not designated as the representative node.

15. A non-transitory processor-readable medium storing code representing instructions to be executed by a processor associated with a node to be included in a plurality of nodes in a network group, the code comprising code to cause the processor to:
detect that a representative node does not exist in the network group;
designate the node as the representative node responsive to detecting that the representative node does not exist;
receive, after designating the node as the representative node, a status retrieval directive requesting status information associated with a target node of the plurality of nodes;
retrieve status information associated with the target node of the plurality of nodes responsive to the status retrieval directive; and
send the status information to a compute device such that the compute device, in response to receiving the status information, stores the status information in a database that is accessible by each node from the plurality of nodes without further communication with the representative node or an inquiry directed to the target node.

16. The non-transitory processor-readable medium of claim 15, wherein the status information includes at least one of: a presence of a node from the plurality of nodes, a type of software installed on a node from the plurality of nodes, a health condition of a node from the plurality of nodes, or proprietary information associated with a node from the plurality of nodes.

17. The non-transitory processor-readable medium of claim 15, wherein the code further comprises code to cause the processor to install, an agent configured to communicate with a set of nodes from the plurality of nodes such that the node can retrieve status information associated with the set of nodes.

18. The non-transitory processor-readable medium of claim 15, wherein the code further comprises code to cause the processor to repeatedly send a query to a set of nodes from the plurality of nodes such that each node from the set of nodes, in response to receiving the query, sends status information associated with each node from the set of nodes to the node.

* * * * *